US011718467B1

(12) United States Patent
Brayman et al.

(10) Patent No.: US 11,718,467 B1
(45) Date of Patent: Aug. 8, 2023

(54) FOLDABLE DISC DISPLAY CASE

(71) Applicant: Vintage Media Grading, Inc., Westerly, RI (US)

(72) Inventors: Chad Brayman, Westerly, RI (US); Michael Harwood, Westerly, RI (US); Paul Brayman, Westerly, RI (US)

(73) Assignee: Vintage Media Grading, Inc.

( * ) Notice: Subject to any disclaimer, the term of this patent is extended or adjusted under 35 U.S.C. 154(b) by 0 days.

(21) Appl. No.: 17/713,497

(22) Filed: Apr. 5, 2022

(51) Int. Cl.
*B65D 85/00* (2006.01)
*G11B 33/02* (2006.01)

(52) U.S. Cl.
CPC .......... *B65D 85/544* (2013.01); *G11B 33/022* (2013.01)

(58) Field of Classification Search
CPC .. B65D 85/544; B65D 85/548; G11B 33/022; G11B 33/04
USPC .......... 206/311, 307, 307.1, 308, 308.1, 309, 206/312, 387.12, 223, 232
See application file for complete search history.

(56) References Cited

U.S. PATENT DOCUMENTS

| | | | | |
|---|---|---|---|---|
| 3,109,539 A | * | 11/1963 | Turoff | B65D 85/544 206/311 |
| 4,627,532 A | * | 12/1986 | Clemens | G11B 33/0405 |
| 4,850,731 A | * | 7/1989 | Youngs | G11B 33/0422 206/311 |
| 5,207,717 A | * | 5/1993 | Manning | G11B 23/023 206/387.13 |
| 5,765,695 A | | 6/1998 | Picciallo | |
| 5,875,614 A | | 3/1999 | Youngs et al. | |
| 6,715,620 B2 | | 4/2004 | Taschek | |
| 2004/0026277 A1 | | 2/2004 | Hitchings | |
| 2004/0026278 A1 | | 2/2004 | Hitchings | |
| 2004/0262177 A1 | * | 12/2004 | Rossiter | G11B 33/045 206/311 |

* cited by examiner

*Primary Examiner* — Rafael A Ortiz
(74) *Attorney, Agent, or Firm* — Argus Intellectual Enterprise; Jordan Sworen; Daniel Enea

(57) ABSTRACT

A foldable case having an ultrasonic seal around a record, wherein the case is capable of displaying one or multiple records in a linear arrangement. The foldable disc display case includes a disc case having a first base plate mounted to a disc plate, wherein the disc case includes an ultrasonic seal and can house a vinyl record. An album case, formed by a second base plate mounted to an album plate, is pivotally connected to the disc case via a hinge to form a side-to-side arrangement. The album case can house an album cover. In some embodiments, the album case is designed to receive a double album cover instead of a single album cover to accommodate a thicker, double album cover. A hinge spacer is mounted between the hinge and the base plates to allow the disc case and the album case to be coplanar with one another.

20 Claims, 9 Drawing Sheets

FOLDABLE DISC DISPLAY CASE

BACKGROUND OF THE INVENTION

The present invention relates to record display cases. The present invention further provides a foldable disc display case for ultrasonically sealing a record and displaying multiple records and an album cover in a linear arrangement Digital downloadable music has made other music storage formats, such as vinyl records, compact discs, and the like, an obsolete format for storing and sharing music data. As a result, people are left with albums that have sentimental value and monetary value but lack the need to play the albums to listen to the music stored thereon. Additionally, album covers have an artistic value that many wish to display alongside the disc or record once stored therein. Album covers also can include significant information about the artist, album, or lyrics that the owner may wish to display. Furthermore, albums and discs can be fragile and susceptible to damage if frequently handled or exposed to harsh lighting environments. Consequently, some album owners desire to preserve and display their music and artistic covers because they no longer utilize the record or disc to hear the stored music.

Known devices allow for records and album covers to be displayed simultaneously, but no known art teaches a vinyl record display case having an ultrasonically sealed disc case that includes a hinge positioned between the sealed disc case and an adjacent album case. The present invention further provides a foldable disc display case having hinge spacers that allow for a hinge to be mounted to the between the cases such that the adjacent cases are coplanar to one another.

In light of the devices disclosed in the known art, it is submitted that the present invention substantially diverges in design elements and methods from the known art and consequently it is clear that there is a need in the art for an improvement for a foldable disc display case. In this regard the instant invention substantially fulfills these needs.

SUMMARY OF THE INVENTION

In view of the foregoing disadvantages inherent in the known types of foldable disc display cases now present in the known art, the present invention provides a new foldable disc display case wherein the same can be utilized for ultrasonically sealing a record and displaying multiple records and an album cover in a linear arrangement.

It is an objective of the present invention to provide an embodiment of the foldable disc display case comprising a disc case pivotally secured to an album case, wherein the disc case is configured to house a vinyl record and the album case is configured to house an album cover.

It is another objective of the present invention to provide an embodiment of the foldable disc display case wherein the disc case comprises a first base plate and a disc plate, wherein the first base plate and the disc plate are ultrasonically sealed together along at least two sides thereof, forming a disc case compartment configured to the vinyl record.

It is yet another objective of the present invention to provide an embodiment of the foldable disc display case wherein the album case comprises a second base plate and an album plate, wherein some embodiments the album plate comprises a width configured to accommodate a single album cover and in other embodiments, the album plate comprises a width configured to accommodate a double album cover.

It is another objective of the present invention to provide an embodiment of the foldable disc display case further comprising a hinge and a pair of hinge spacers pivotally connecting the disc case to the album case, wherein the hinge spacers are configured to allow the hinge to be mounted between the first base plate and the second base plate such that the adjacent disc case and the album case are coplanar.

It is another objective of the present invention to provide an embodiment of the foldable disc display case comprising a single, double, or plurality configuration, such that the disc and album cases are formed linearly. In this way, multiple vinyl records can be displayed in a single row on a wall.

It is therefore an object of the present invention to provide a new and improved foldable disc display case that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. For the purposes of presenting a brief and clear description of the present invention, the preferred embodiment will be discussed as used for storing and displaying a vinyl record and album cover. The figures are intended for representative purposes only and should not be considered to be limiting in any respect.

Reference will now be made in detail to the exemplary embodiment (s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment", "an alternate embodiment", "first embodiment", "second embodiment", or "third embodiment" does not necessarily refer to the same embodiment. Additionally, "vinyl record", "record", and "disc" may be used interchangeably, and all refer to the type of music storage format.

Figure 1:
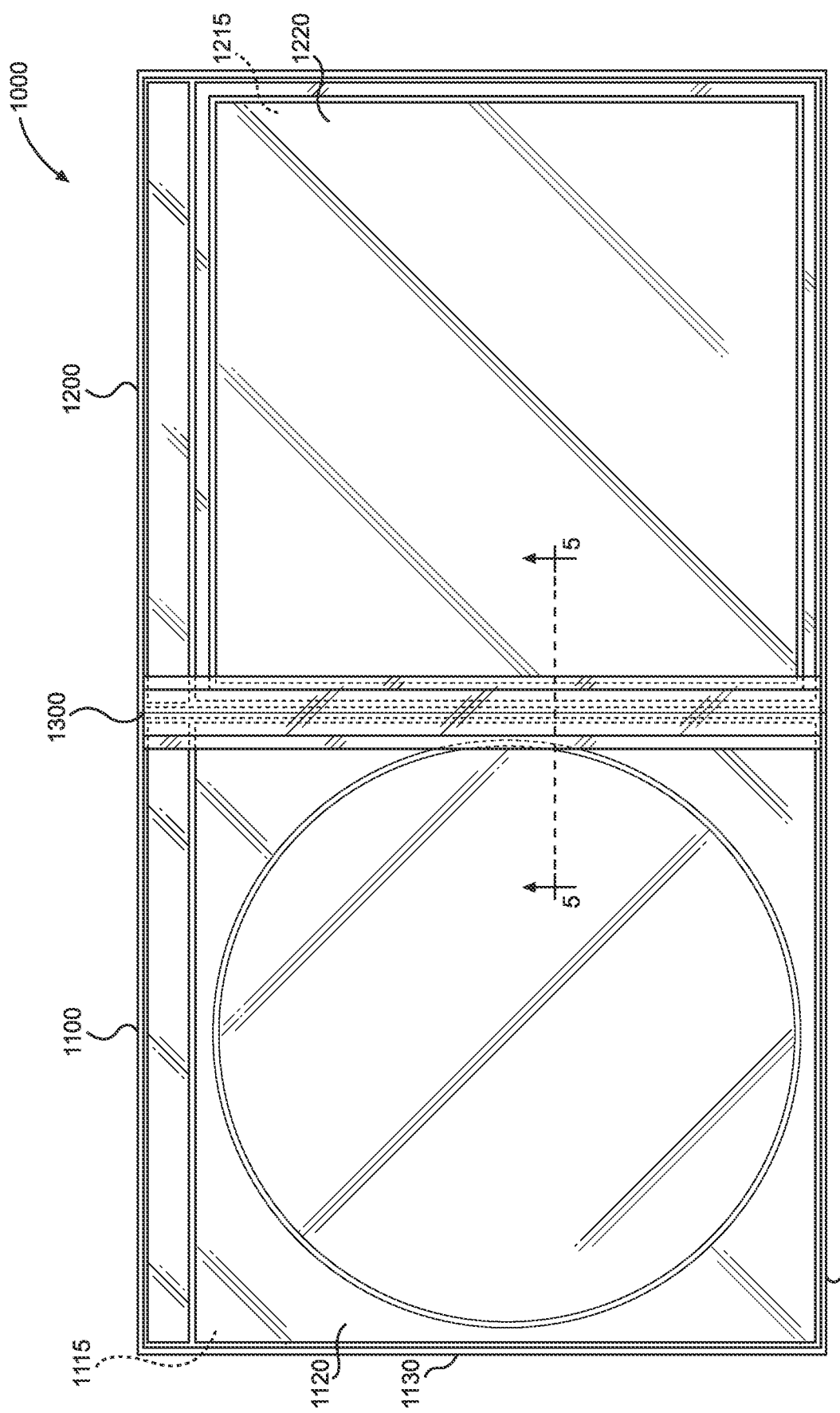
FIG. 1 shows a front view of a first embodiment of the foldable disc display case.

Referring now to FIG. 1, there is shown a front view of a first embodiment of the foldable disc display case. The foldable disc display case 1000 comprises a disc case 1100 having a first base plate 1115 mounted to a disc plate 1120. The disc case 1100 is configured to house a vinyl record or other disc shaped music storage device. The foldable disc display case 1000 further comprises an album case 1200 having a second base plate 1215 mounted to an album plate 1220, wherein the album case 1200 is configured to house an album cover that corresponds with the vinyl record housed within the disc case 1100. In the illustrated embodiment, the disc case 1100 is pivotally connected to the album case 1200 along an adjoining interior sidewall 1300, forming a linear or side-by-side arrangement. In the illustrated embodiments, the base plates 1115, 1215, the disc plate 1120, and the album plate 1220 are composed of a transparent, rigid material, such as a hard plastic. In alternate embodiments, the plates are composed of any suitable rigid material configured to prevent the disc case 1100 and album case 1200 from bending under manual manipulation by a user. The transparent material allows the record and the album to remain entirely visible while on display. In some embodiments, only the disc plate and the album plate are transparent, wherein the base plates comprise a color or a tint. In the illustrated embodiment, the plates all comprise a substantially square cross-sectional shape. In alternate embodiments, the plates comprise any suitable shape configured to receive a record and an album cover in the respective disc case 1100 and album case 1200.

In the illustrated embodiment, the disc case 1100 comprises an ultrasonic seal 1130 disposed around a perimeter 1135 of the disc case 1100, joining the first base plate 1115 to the disc plate 1120. In some embodiments, the disc case 1100 is sealed after a vinyl record is placed therein. This prevents the record from being damaged or the music sound from being compromised during the sealing process as compared to other sealing methods, such as a heat seal. In some embodiments, the ultrasonic seal extends around at least one side of the perimeter of the disc case. In other embodiments, the ultrasonic seal extends entirely around a perimeter of disc case. In some embodiments, the ultrasonic seal is disposed around both the disc case and the album case. In alternate embodiments, the disc case does not comprise an ultrasonic seal.

Figure 2:
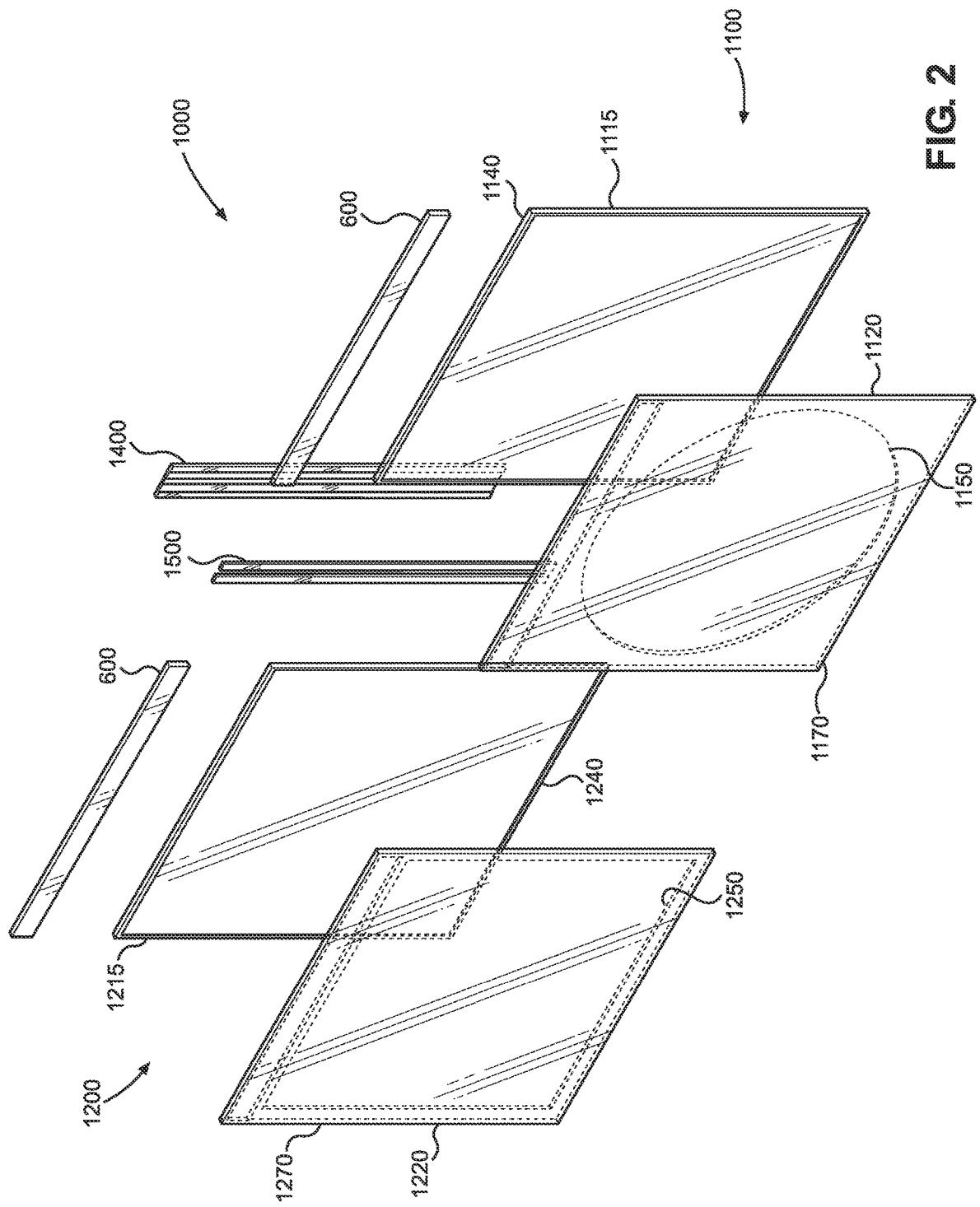
FIG. 2 shows an exploded view of a first embodiment of the foldable disc display case.

Referring now to FIG. 2, there is shown an exploded view of a first embodiment of the foldable disc display case. In the illustrated embodiment, the first and second base plates 1115, 1215 comprise a planar interior side and a planar exterior side. A first raised perimeter edge 1140 extends around the entire perimeter of the first base plate 1115 and a second raised perimeter edge 1240 extends around the entire perimeter of the second base plate 1215. The raised perimeter edges 1140, 1240 allow each base plate 1115, 1215 to be encase a ledge or groove 1170, 1270 disposed along a perimeter of the respective disc plate 1120 and album plate 1220 when mounted thereto. In alternate embodiments, the raised perimeter edges are enclosed by a groove in a perimeter of the respective disc plate 1120 and album plate 1220 when mounted thereto.

Figure 3:
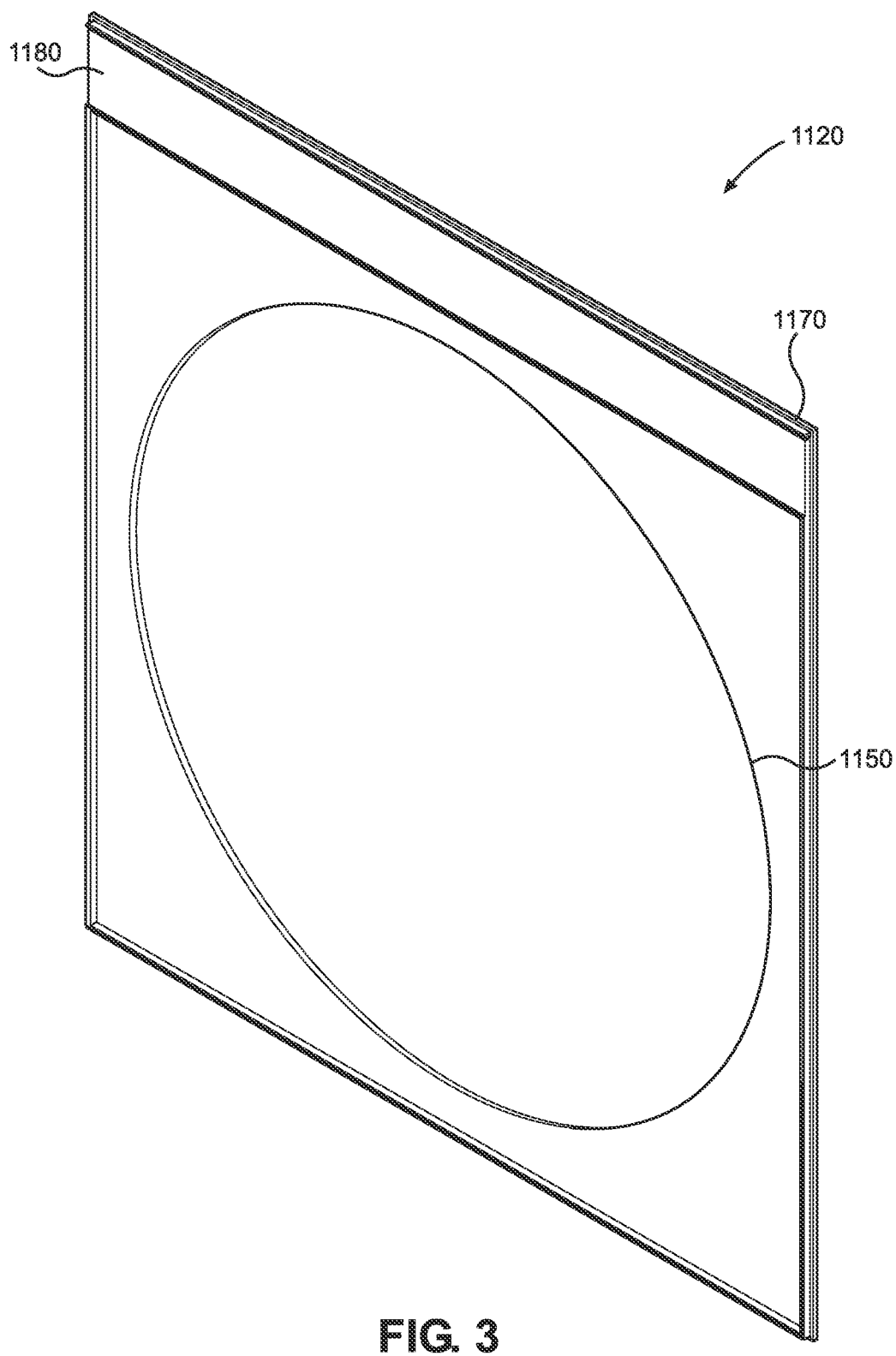
FIG. 3 shows a perspective view of a disc plate of an embodiment of the foldable disc display case.

Referring now to FIG. 3, there is shown a perspective view of a disc plate of an embodiment of the foldable disc display case. In the illustrated embodiment, the disc plate 1120 comprises a raised circular ledge 1150 or rim extending from an interior surface thereof. The interior surface faces the first base plate 1115 when mounted thereto. The ledge 1150 comprises a substantially similar circumference as a disc adapted to be placed therein. A thickness of the ledge is substantially equivalent to a thickness of the record to be placed therein. The ledge 1150 is positioned in a center of the disc plate 1120. In the illustrated embodiment, an exterior side of the disc plate 1120 is planar.

Figure 4:
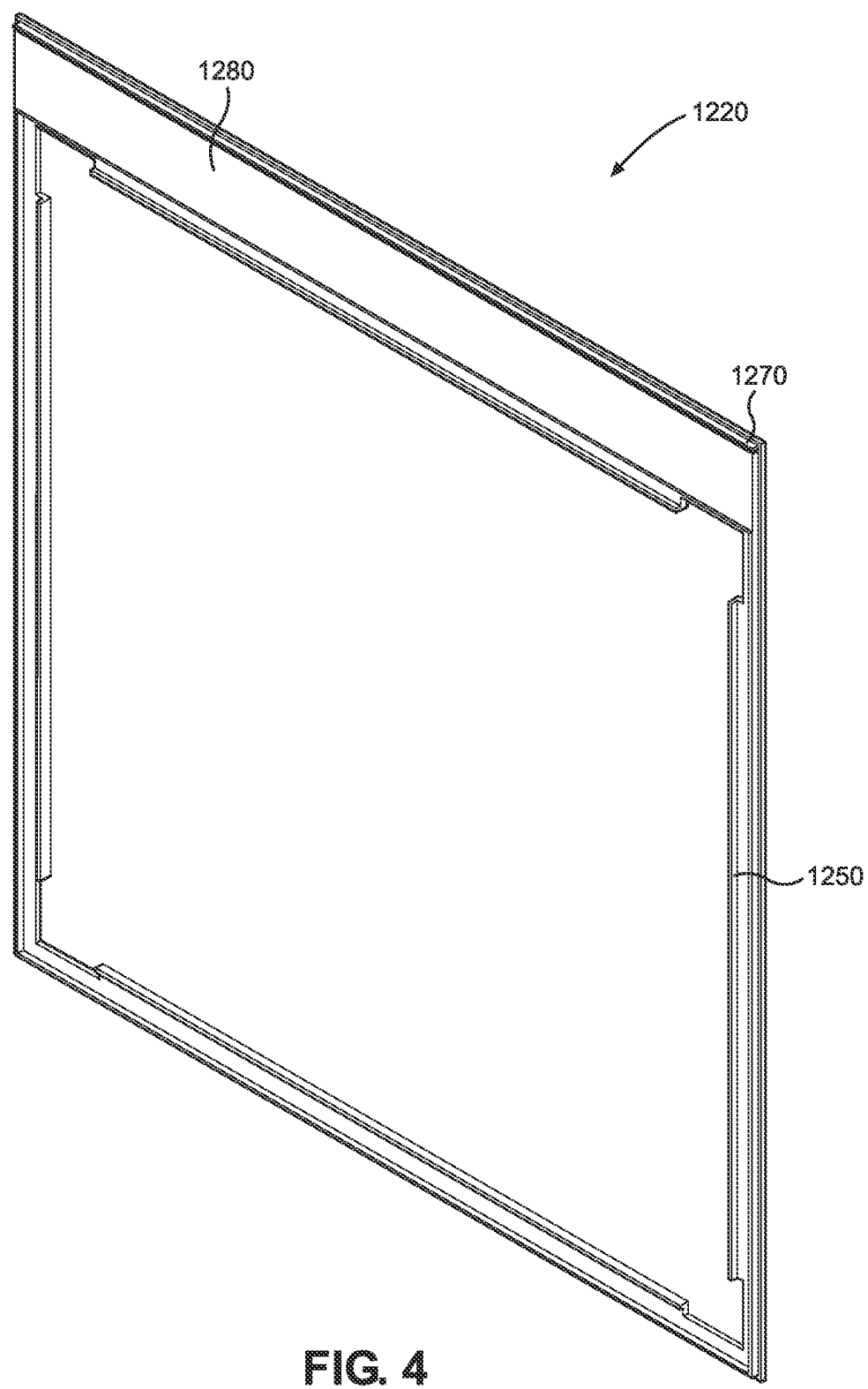
FIG. 4 shows a perspective view of an album plate of an embodiment of the foldable disc display case.

Referring now to FIG. 4, there is shown a perspective view of an album plate of an embodiment of the foldable disc display case. In the illustrated embodiment, the album plate 1220 comprises a raised ledge 1250 extending from an interior surface thereof. The interior surface faces the second base plate 1215 when mounted thereto. The ledge 1250 comprises a substantially similar shaped perimeter as a square album cover adapted to be placed therein. The ledge 1250 is positioned in a center of the album plate 1220. In the illustrated embodiment, an exterior side of the album plate 1220 is planar. In some embodiments, the ledge 1150 extends around at least four sides of the album plate 1220. In the illustrated embodiment, a recess or space is created at each corner on the interior side of the album plate 1220 such that a user can easily place or remove an album cover from the album plate 1220.

In the illustrated embodiment shown in FIGS. 3 and 4, both the disc plate 1120 and the album plate 1220 each comprise a label base 1180, 1280 configured to receive a label heading 600 disposed at the top of the respective disc case 1100 and album case 1200. The label plate 1180, 1280 extends a majority of a length of each case 1100, 1200, between a pair of opposing lateral sidewalls. The label base on the disc plate 1120 is disposed above the raised disc ledge 1150 and the label base on the album plate 1220 is disposed above the raised album ledge 1250. In some embodiments, the foldable disc display case does not include a label base. In other embodiments, only the disc case or the album case comprise a label base. In other embodiments, a label heading 600 is sandwiched within each case, wherein a label base is not needed.

Figure 5:
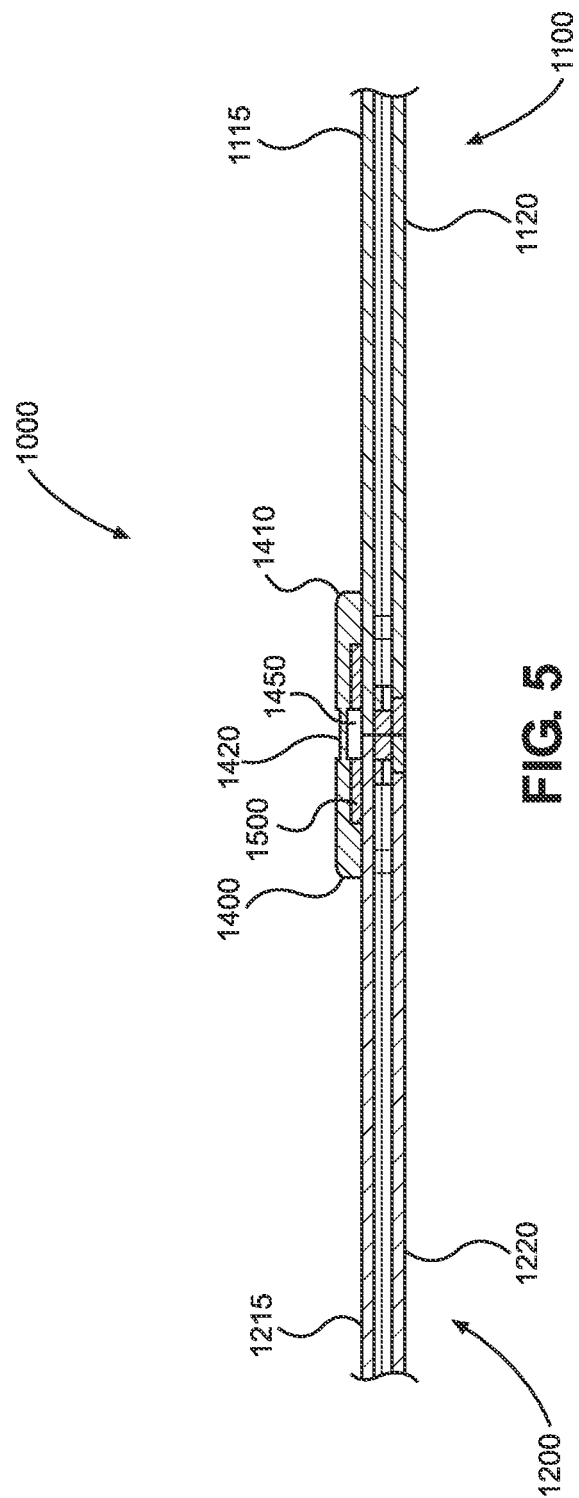
FIG. 5 shows a partial cross-sectional view of a first embodiment of the foldable disc display case taken along lines 5-5 of FIG. 1.
Figure 9:
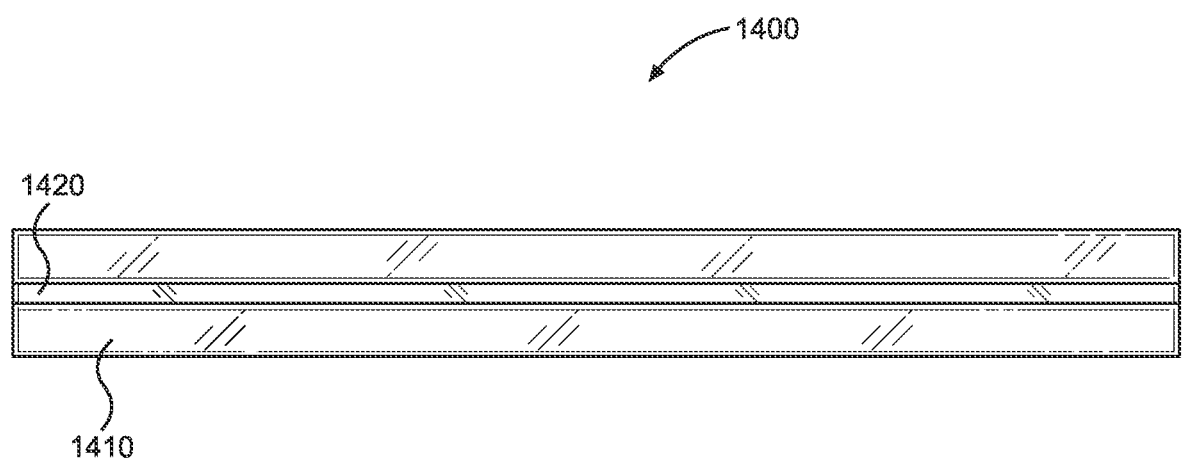
FIG. 9 shows a front view of a hinge of an embodiment of the foldable disc display case.
Figure 10:
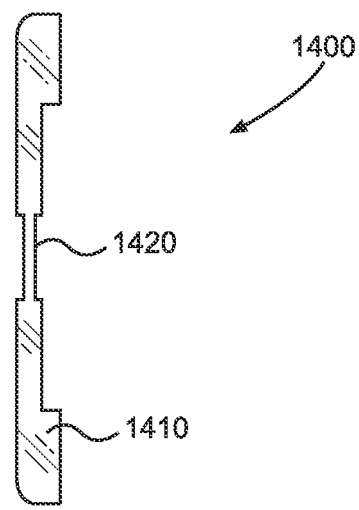
FIG. 10 shows a top planar view of a hinge of an embodiment of the foldable disc display case.

Referring now to FIGS. 2 and 5, there is shown the exploded view of a first embodiment of the foldable disc display case and a partial cross-sectional view of a first embodiment of the foldable disc display case taken along lines 5-5 of FIG. 1, respectively. The disc case 1100 is pivotally secured to the album case 1200 via a hinge 1400 (also seen in FIGS. 9 and 10). In the illustrated embodiment, the hinge 1400 extends along the entire adjoining interior sidewalls 1300 of the disc case 1100 and the album case 1200. In alternate embodiments, the hinge extends only partially along the adjoining interior sidewall. In the illustrated embodiment, the hinge 1400 is a plastic piano hinge. In alternate embodiments, any suitable hinge is used adapted to allow the cases 1100, 1200 to fold and pivot relative to one another. The hinge 1400 comprises a pair of L-shaped arms 1410 connected by a flexible member 1420. the distal end of a first L-shaped arm 1410 is connected to the exterior side of the first base plate 1115 and the distal end of a second L-shaped arm is connected to the exterior side of the second base plate 1215, wherein a gap is formed between an interior side of the hinge 1400 and the exterior sides of the base plates 1115, 1215.

In the illustrated embodiment, a pair of hinge spacers 1500 are disposed within the gap of the hinge 1400 to allow the hinge 1400 to be mounted between the first base plate and the second base plate such that the adjacent disc case and the album case are coplanar with one another. Here, coplanar is defined as laying on a same plane such that the first and second base plates lay on a same plane and the disc plate and album plate lay on a same plane when in a non-folded configuration. In the illustrated embodiment, the hinge spacers 1500 comprise a rod-like shape extending a same length as the hinge 1400. In alternate embodiments, the hinge spacers 1500 extend only a portion of the hinge length. In the illustrated embodiment, a space 1450 remains between the pair of hinge spacers 1500, above the flexible member 1420.

The foldable disc display case 1000 is movable between a folded configuration and an unfolded configuration as a result of the hinge and hinge spacer assembly. In the folded configuration, the disc case 1100 and the album case 1200 are configured to rotate towards each other and stack above one another such that the exterior sides of the disc plate 1120 and the album plate 1220 contact each other. This way, the foldable disc display case 1000 can be stored in a compact position. In the unfolded configuration, the disc case 1100 and the album case 1200 are disposed side by side for displaying on a wall. In positions between the folded and unfolded configurations, the disc case and the album case form an angle less than 180 degrees between each other and can be displayed in a propped position on a horizontal surface.

Figure 6:
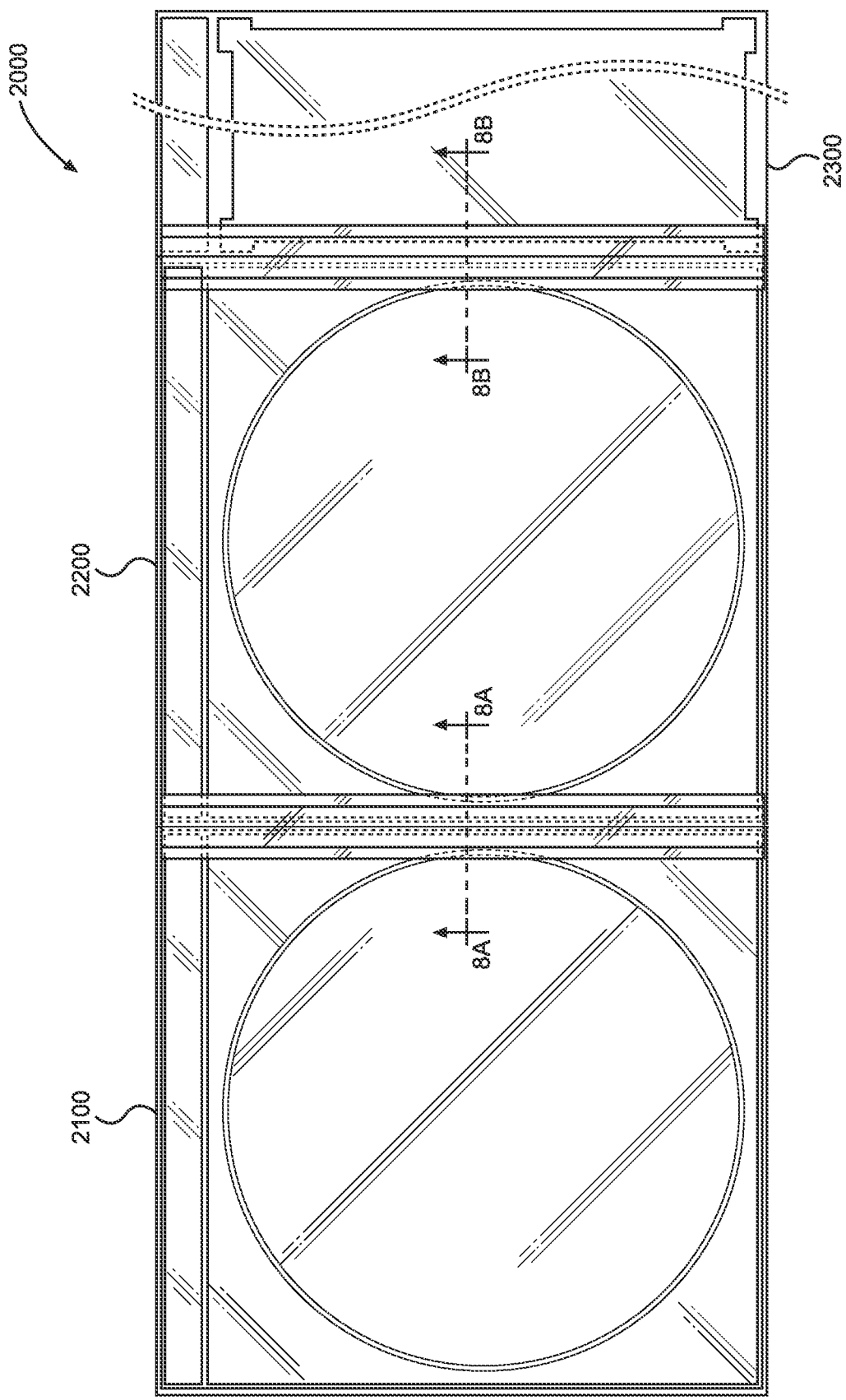
FIG. 6 shows a front view of a second embodiment of the foldable disc display case.

Referring now to FIG. 6, there is shown a front view of a second embodiment of the foldable disc display case. In the illustrated embodiment, the foldable disc display case 2000 comprises a first disc case 2100 and a second disc case 2200. In the illustrated embodiment, the foldable disc display case 2000 further comprises an album case 2300. The disc and album cases 2100, 2200, 2300, are pivotally secured to one another in a side-by-side or linear arrangement. In alternate embodiments, the foldable disc display case comprises more than two disc cases each pivotally secured to another disc case or an album case. In other embodiments, the foldable disc display case comprises two or more album cases pivotally secured to another album case or a disc case.

Figure 7:
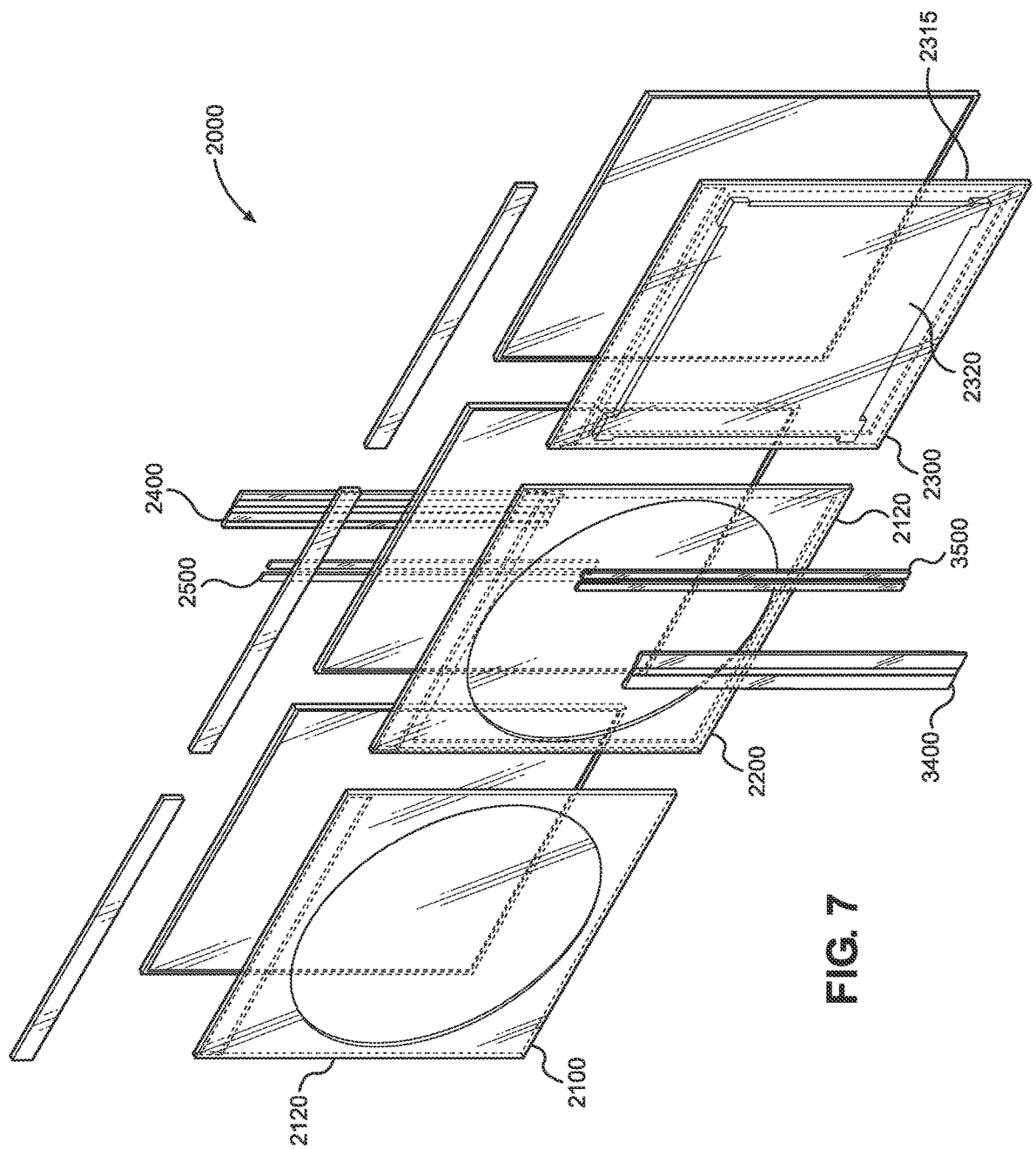
FIG. 7 shows an exploded view of a second embodiment of the foldable disc display case.
Figure 8A:
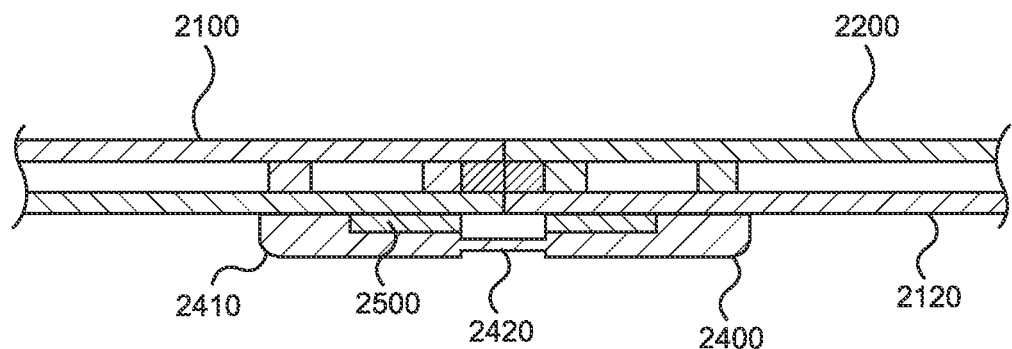
FIG. 8A shows a partial cross-sectional view of a second embodiment of the foldable disc display case taken along lines 8A-8A of FIG. 6.
Figure 8B:
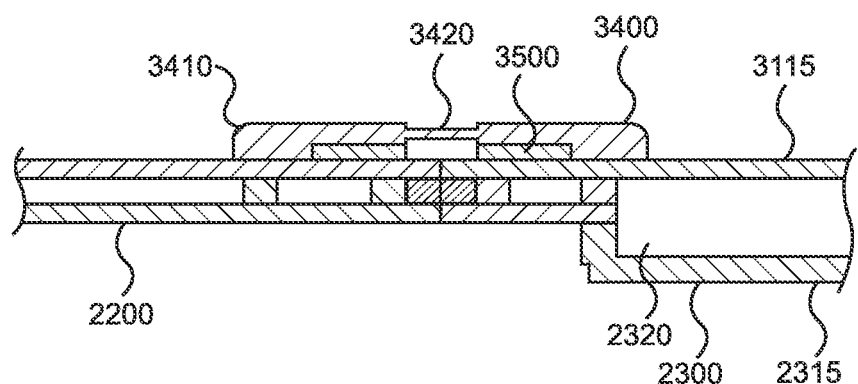
FIG. 8B shows a partial cross-sectional view of a second embodiment of the foldable disc display case taken along lines 8B-8B of FIG. 6.

Referring now to FIGS. 7-8B, there is shown an exploded view of a second embodiment of the foldable disc display case, a partial cross-sectional view of a second embodiment of the foldable disc display case taken along lines 8A-8A of FIG. 6, and a partial cross-sectional view of a second embodiment of the foldable disc display case taken along lines 8B-8B of FIG. 6, respectively. In some embodiments, each disc case and album case comprise the same features as described in the first embodiment. The first and second disc cases 2100, 2200 are pivotally secured to one another via the hinge 2400 having a pair of L-shaped arms 2410 and a flexible member 2420 therebetween. A pair of hinge spacers 2500 are disposed within the gap of the hinge 2400, wherein the distal ends of the L-shaped arms are secured to the exterior sides of the disc plates 2120 (as shown in FIG. 8A).

The second disc case 2200 is positioned between the first disc case 2100 and the album case 2300. The second disc case 2200 and the album case 2300 are pivotally secured to one another via the hinge 3400 having a pair of L-shaped arms 3410 and a flexible member 3420 therebetween. A pair of hinge spacers 3500 are disposed within the gap of the hinge 3400, wherein the distal ends of the L-shaped arms are secured to the exterior sides of the base plates 3115 (as shown in FIG. 8B).

The foldable disc display case comprises at least one disc case that is ultrasonically sealed to encase a disc or record, such as a long play vinyl record. In some embodiments, the disc case includes the disc already sealed therein, such that the disc cannot be removed from the disc case. The display case is provided in a single, double, or plurality configuration, such that the disc and album cases are formed linearly. In this way, multiple vinyl records can be displayed on a wall. In the shown embodiments, the album case is included and positioned towards a perimeter of the disc case so as to prominently display information related to the vinyl record. However, in some embodiments, the album case is not included. In embodiments with more than one disc case or a disc case and an album case, the hinge is positioned along the adjoining interior sidewalls. The hinge allows for folding of the disc cases holding the vinyl records. Hinge spacers are included in some embodiments to allow for the hinge to be mounted to the plates such that the adjacent cases are coplanar.

In the illustrated embodiment, the album case 2300 is configured to receive a double album cover and comprises a base plate 3115 and a second album plate 2315. The second album plate 2315 comprises a recess 2320, wherein the base of the recess protrudes from the front side of the second album plate 2315, such that the front side of the second album plate is not entirely planar. The recess within 2320 second album plate provides additional room for the album case 2300 to receive a thicker album cover than the album case illustrated in FIG. 5. In the illustrated embodiment, the recess 2320 comprises a rectangular shaped cross section disposed beneath the label base.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:
1. A foldable disc display case, comprising:
   a disc case having a first base plate mounted to a disc plate, wherein the disc case is configured to house a vinyl record;
   an album case having a second base plate mounted to an album plate, wherein the album case is configured to house an album cover;

wherein the disc case is pivotally connected to the album case forming a side-by-side arrangement;

wherein the base plates, the disc plate, and the album plate are rigid;

wherein the first base plate and the disc plate are in contact along an entire perimeter edge, wherein the entire perimeter edge is configured to enclose and seal the vinyl record therein;

wherein at least two sides of the perimeter edge are ultrasonically sealed, wherein the seal prevents separation of the disc plate from the first base plate along the entire perimeter edge and configured to prevent the removal of the vinyl record from the disc case.

2. The foldable disc display case of claim 1, further comprising the vinyl record.

3. The foldable disc display case of claim 1, wherein the first and second base plate having a planar interior side, a planar exterior side, and a raised perimeter edge extending around the planar interior side such that the raised perimeter edge is configured to mate with a groove extending around a perimeter of the disc plate and the album plate, respectively.

4. The foldable disc display case of claim 1, further comprising a second disc case wherein the disc case, the second disc, and the album case are aligned linearly to allow multiple vinyl records to be displayed in a single foldable disc display case.

5. The foldable disc display case of claim 1, further comprising a hinge disposed between the disc case and the album case.

6. The foldable disc display case of claim 5, wherein the hinge extends an entire length of an adjoining interior sidewalls of the first base plate and the second base plate.

7. The foldable disc display case of claim 5, wherein the hinge comprises a pair of L-shaped arms connected to one another by a flexible member.

8. The foldable disc display case of claim 7, wherein a distal end of each L-shaped arm is secured to the first base plate and the second base plate, respectively.

9. The foldable disc display case of claim 5, further comprising a hinge spacer disposed on an exterior side of the disc case and an exterior side of the album case.

10. The foldable disc display case of claim 9, wherein the hinge spacers are not co-extensive with the flexible member of the hinge.

11. The foldable disc display case of claim 9, wherein the hinge spacers comprise a rectangular cross section and extend a same length as a length of the hinge.

12. The foldable disc display case of claim 1, further comprising a raised circular ledge extending from an interior surface of the disc plate, wherein the raised circular ledge comprises a same thickness as the vinyl record and is adapted to receive the vinyl record therein.

13. The foldable disc display case of claim 1, further comprising a raised ledge extending from an interior surface of the album plate, wherein the raised square ledge comprises a same thickness as the album cover and is adapted to receive the album cover therein.

14. The foldable disc display case of claim 9, wherein the foldable disc display case is movable between a folded configuration and an unfolded configuration as a result of the hinge and the hinge spacer assembly.

15. The foldable disc display case of claim 14, wherein the folded configuration, the disc case and the album case are configured to rotate towards each other and stack above one another such that exterior sides of the disc plate and the album plate contact each other.

16. The foldable disc display case of claim 14, wherein the unfolded configuration, the disc case and the album case are disposed side by side along a same plane for displaying on a wall.

17. The foldable disc display case of claim 1, wherein the album plate comprises a recess that protrudes from a front side thereof, such that the album case is configured to house a double album cover.

18. A foldable disc display case, comprising:
   a disc case having a first base plate mounted to a disc plate, wherein the disc case is configured to house a vinyl record;
   an album case having a second base plate mounted to an album plate, wherein the album case is configured to house an album cover;
   wherein the disc case is pivotally connected to the album case forming a side-by-side arrangement;
   wherein the base plates, the disc plate, and the album plate are rigid;
   wherein the first base plate and the disc plate are ultrasonically sealed together along an entire perimeter, wherein the seal is configured to enclose the vinyl record and prevent removal of the vinyl record from the disc case.

19. The foldable disc display case of claim 18, wherein the first base plate and the disc plate are in contact along the entire perimeter edge.

20. The foldable disc display case of claim 1, wherein an entire perimeter edge of the second base plate is in contact with an entire perimeter edge of the album plate, such that the album cover adapted to be disposed within the album case is sealed therein.

* * * * *